United States Patent
Rozman et al.

(10) Patent No.: US 9,819,224 B2
(45) Date of Patent: Nov. 14, 2017

(54) DUAL-SOURCE MULTI-MODE VEHICLE POWER SUPPLY

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 298 days.

(21) Appl. No.: 14/813,801

(22) Filed: Jul. 30, 2015

(65) Prior Publication Data
US 2017/0033594 A1 Feb. 2, 2017

(51) Int. Cl.
| | | |
|---|---|---|
| H02J 1/14 | (2006.01) |
| H02J 9/06 | (2006.01) |
| H02J 7/00 | (2006.01) |
| H02M 7/04 | (2006.01) |
| B60L 11/12 | (2006.01) |
| H02J 7/14 | (2006.01) |
| H02J 7/34 | (2006.01) |

(52) U.S. Cl.
CPC ............... *H02J 9/061* (2013.01); *B60L 11/12* (2013.01); *H02J 1/14* (2013.01); *H02J 7/0068* (2013.01); *H02J 7/1438* (2013.01); *H02J 7/34* (2013.01); *H02M 7/04* (2013.01)

(58) Field of Classification Search
CPC ............... H02J 1/14; H02J 7/1438; H02J 7/34
USPC .......................................................... 307/9.1
See application file for complete search history.

(56) References Cited

U.S. PATENT DOCUMENTS

| | | | |
|---|---|---|---|
| 6,114,775 A | 9/2000 | Chung et al. |
| 7,459,889 B2 | 12/2008 | Ganev et al. |
| 7,876,542 B2 | 1/2011 | Rozman et al. |
| 8,378,641 B2 | 2/2013 | Rozman et al. |
| 8,581,425 B2 | 11/2013 | Rozman et al. |
| 8,629,644 B2 | 1/2014 | Rozman et al. |
| 8,699,251 B2 | 4/2014 | Rozman et al. |
| 8,890,463 B2 | 11/2014 | Rozman et al. |
| 9,059,647 B2 | 6/2015 | Rozman et al. |
| 2004/0164616 A1 | 8/2004 | Obayashi |

(Continued)

FOREIGN PATENT DOCUMENTS

JP          2005045883 A          2/2005

OTHER PUBLICATIONS

European Search Report for EP16181895, dated Feb. 7, 2017, 7 pages.

*Primary Examiner* — Robert Deberadinis
(74) *Attorney, Agent, or Firm* — Cantor Colburn LLP

(57) ABSTRACT

A dual-source multi-mode power supply system includes a battery power supply, a first DC bus, an electric power generating system and a second DC bus. The battery power supply includes a DC-DC converter circuit configured to convert a first DC voltage into a second DC voltage for supplying power to the first DC bus. The electric power generating system includes a permanent magnet generator and an active rectifier circuit configured to convert a variable-voltage/variable-frequency output into a constant high-voltage direct current (HVDC) to supply power to a second DC bus. An electronic coordinated control module determines a load request, and controls one or more switch such that the power from the first DC bus and power from the second DC bus are delivered to the loads to satisfy the load request.

16 Claims, 3 Drawing Sheets

(56) References Cited

U.S. PATENT DOCUMENTS

| | | |
|---|---|---|
| 2010/0276993 A1 | 11/2010 | King |
| 2014/0028094 A1 | 1/2014 | Rozman et al. |
| 2014/0203639 A1 | 7/2014 | Rozman et al. |
| 2014/0265560 A1 | 9/2014 | Leehey et al. |
| 2015/0002975 A1 | 1/2015 | Rozman et al. |

| Operating Mode | Active Rectifier Control | DC-DC Converter Control | SW1 | SW2 | SW3 |
|---|---|---|---|---|---|
| Engine Start | Output Frequency | DC Bus 1 Current | open | closed | open |
| Battery Charge | DC Bus 2 Voltage | Disable | closed, normal | closed | closed, normal |
| Generate Normal 1 | DC Bus 2 Voltage | DC Bus 1 Voltage | closed | open | closed |
| Generate Normal 2 | DC Bus 2 Voltage | DC Bus 1 Current | closed | closed | closed |
| Generate Overload A | DC Bus 2 Voltage | DC Bus 1 Current | closed/open | closed | closed |
| Generate Overload B | DC Bus 2 Voltage | DC Bus 1 Current | closed | closed | closed/open |
| Generate Load A Short | DC Bus 2 Voltage | DC Bus 1 Current | closed/open | closed | closed/open |
| Generate Load B Short | DC Bus 2 Voltage | DC Bus 1 Current | closed/open | closed | closed/open |
| "Silent" Mode | Disable | DC Bus 1 Voltage | closed | closed | closed |

DUAL-SOURCE MULTI-MODE VEHICLE POWER SUPPLY

TECHNICAL FIELD

The present disclosure generally relates to power systems, and more particularly, to a vehicle power supply.

BACKGROUND

Traditional vehicle electric power generating systems require the capability of managing overload conditions that can reach 20-50% or higher than the rated load connected to the system. With respect to ground vehicles, for example, conventional power supply systems typically employ an un-regulated permanent magnet generator (PMG) and active rectifier to supply high voltage direct current (HVDC). The active rectifier comprises a bidirectional pulse width modulation (PWM) converter including one or more switching devices, such as an insulated-gate bipolar transistor (IGBT), for example, which is sized to support both the rated DC bus current and the overload DC bus current. The voltage overshoot across the IGBT is caused by the energy stored in the magnetic field of the current path, such as the DC-link connections. The voltage linked to the DC-link connections can be expressed as: $V=L_s \times (di/dt)$, where $L_s$ is the parasitic or stray inductance of DC-link connections, and $di/dt$ is rate of fall of current. The voltage across the IGBT may exceed the maximum blocking voltage of the IGBT due to the addition of the DC-link voltage ($V_{DC}$) and voltage (V) linked to the DC-link connections.

To minimize parasitic DC-link inductance, a conventional vehicle power supply typically employs a laminated bus bar system and one or more short connections between the voltage source (DC-link capacitor) and the IGBT. The increased DC bus currents, which may be caused by overload or short-circuit conditions, also typically required the implantation of snubber capacitors. Snubber capacitors are typically are mounted directly on the DC-link terminals of each IGBT to improve safety voltage margins for selected IGBT modules and DC bus capacitors. These additional snubber capacitors, however, complicate packaging design resulting in increased cost, size and or weight of the overall system.

SUMMARY

According to a non-limiting embodiment, a dual-source multi-mode power supply system includes a battery power supply, a first DC bus, an electric power generating system and a second DC bus. The battery power supply includes a DC-DC converter circuit configured to convert a first DC voltage into a second DC voltage for supplying power to the first DC bus. The electric power generating system includes a permanent magnet generator and an active rectifier circuit configured to convert a variable-voltage/variable-frequency output into a constant high-voltage direct current (HVDC) to supply power to a second DC bus. An electronic coordinated control module determines a load request, and controls one or more switch such that the power from the first DC bus and power from the second DC bus are delivered to the loads to satisfy the load request.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a table illustrating various operating modes of the dual-source multi-mode power supply system of FIG. 1 according to a non-liming embodiment.

DETAILED DESCRIPTION

Various embodiments provide a dual-source multi-mode power supply system including a battery source and engine driven PMG source. The battery source generates a voltage that is converted to a high voltage direct current (HVDC) using an isolated DC-DC power converter to form a battery powered DC bus. An active rectifier provides a controlled second DC bus by converting PMG variable-voltage/variable-frequency output to a constant HVDC bus. The active rectifier enables bidirectional power flow to support batter powered DC bus during an electric engine start event. The dual-source multi-mode power supply is configured to operate in various different powering modes based on the operating conditions and/or desired loads of the system. Accordingly, at least one embodiment provides a dual-source multi-mode power supply that optimizes use of existing assets of the vehicle's electric power generating system and supports multiple functions without oversizing individual power converters.

Figure 1:
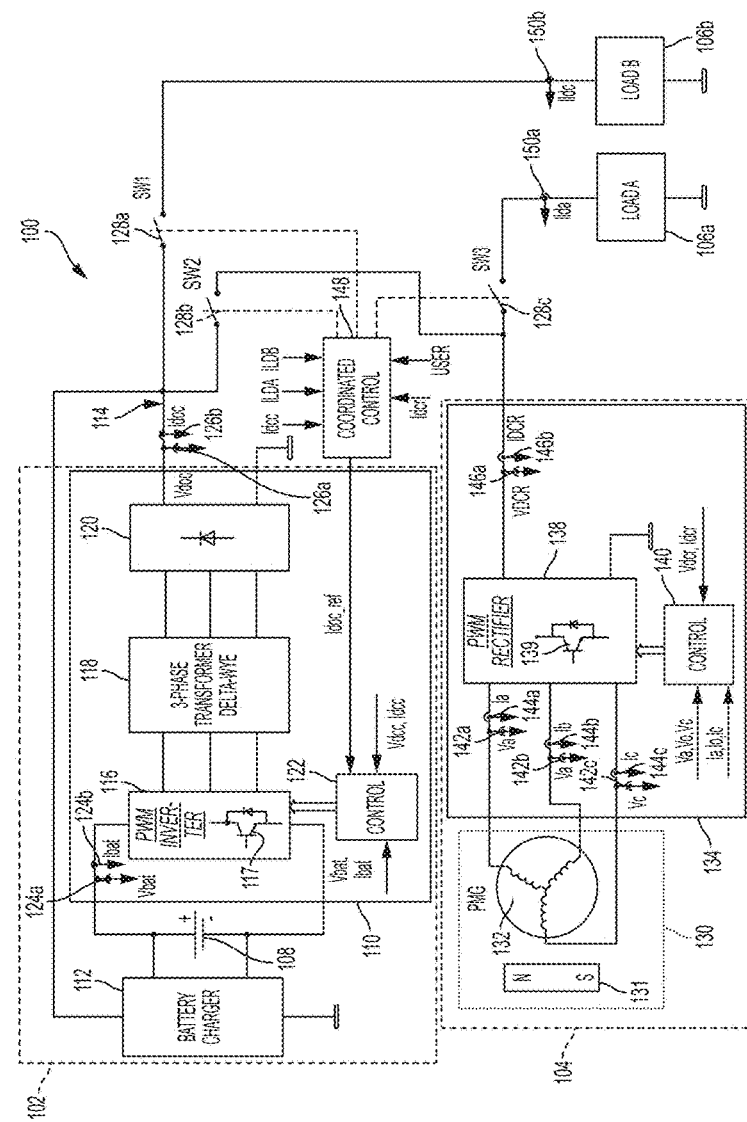
FIG. 1 is a functional diagram of a dual-source multi-mode power supply system according to a non-liming embodiment.

With reference now to FIG. 1, a dual-source multi-mode power supply system 100 is illustrated according to a non-limiting embodiment will be described in greater detail. The dual-source multi-mode power supply system 100 includes a battery power supply 102 and an electrical power generating system (EPGS) 104. The outputs of the battery power supply 102 and the EPGS 104 can be selectively controlled to initiate various different powering modes for driving one or more loads 106a-106b. Although two loads 106a-106b are illustrated, it should be appreciated that the number of loads connected to the system 100 is not limited thereto.

The battery power supply 102 includes a battery 108, an isolated DC-DC converter 110, and a battery charging circuit 112. The battery 108 generates a DC battery voltage that is delivered to the isolated DC-DC converter 110. According to an embodiment, the battery charging circuit 112 may be connected to the battery 108 when a power level of the battery 108 falls below a threshold level and/or in response to receiving a user input request to charge the battery 108.

The DC-DC converter 110 is configured to convert the battery voltage into a stepped-up high voltage direct current (HVDC) supply, which is delivered to a first DC bus 114, i.e., a DC battery bus. According to a non-limiting embodiment, the isolated DC-DC converter includes a PWM inverter 116, a transformer 118, and a rectifier circuit 120. The PWM inverter 116 includes one or more switching elements 117 such as an IGBT, for example, which are controlled by an inverter controller 122 based on various operating conditions of the system 100. For instance, the inverter controller 122 receives battery voltage and current measurements ($V_{batt}$, $I_{batt}$) from battery sensors 124a-124b, converter voltage and current measurements ($V_{dcc}$, $I_{dcc}$) from converter sensors 126a-126b, and a current reference signal ($I_{dccREF}$). The current reference signal $I_{dccREF}$ is utilized by the inverter controller 122 as a reference value to determine the necessary level of the $I_{dcc}$ to be delivered to the one or more of the loads 106a-106b so as to maintain the output of the EPGS 104 at a preferred or rated current level.

The transformer 118 may be constructed as a three-phase high-frequency transformer 118 having a delta-to-wye winding arrangement, for example, and to step up the voltage output from the PWM inverter 116. The AC power is then rectified by the rectifier circuit 120 so as to generate a rectified HVDC signal. The rectifier circuit 120 may be constructed according to various configurations including, but not limited to, a 6-pulserectifier 120. The rectified HVDC signal is delivered to the first DC bus 114, which can be selectively connected to one or more of the loads 106a-106b via switches 128a-128c as discussed in greater detail below. The rectified HVDC signal delivered to the DC bus ranges from approximate 270V to approximately 800V. It should be appreciated that various other topologies capable of minimize switching losses while converting the battery voltage into the high voltage supply (HVDC) may be implemented. For example, other isolated DC-DC converter topologies may include a three-phase DC-DC converter with a different transformer arrangement including, but not limited to, a delta-delta arrangement, a wye-wye arrangement, and a wye-delta arrangement.

The EPGS 104 enables bidirectional power flow to support an engine start event. During engine start the EPGS 104 receives power provided by the first DC bus 114. According to a non-limiting embodiment, the EPGS 104 includes a permanent magnet generator (PMG) 130, a PMG winding assembly 132 disposed in proximity of the PMG 130, and an active rectifier 134 connected to the PMG winding assembly 132. The PMG winding assembly 132 produces a PMG variable voltage-variable frequency output. The active rectifier 134 converts the PMG variable-voltage/variable-frequency output to a constant HVDC output so as to provide a second DC bus 136.

More specifically, magnetic flux provided by the permanent magnets (PM) 131 interacts with the PMG winding assembly 132 to induce an AC voltage that is delivered to a PWM rectifier 138. The PWM rectifier 138 includes one or more switching elements 139 such as an IGBT, for example, which are controlled by a PWM controller 140 so as to convert the AC voltage into a rectified DC voltage. The rectified DC voltage is then output to form the second DC bus 136 that provides a constant HVDC output. The constant HVDC output supplied to the second DC bus 136 ranges, for example, from approximately 270V to approximately 800V. The PWM controller 140 receives winding voltages values ($V_a$-$V_c$) measured by winding voltage sensors 142a-142c, winding current values ($I_a$-$I_c$) measured by winding current sensors 144a-144b, a rectifier voltage value ($V_{dcr}$) measured by a DC bus voltage sensor 146a, and a rectifier current ($I_{dcr}$) value measured by a DC bus current sensor 146b. Accordingly, the PWM controller 140 utilizes a field oriented control (FOC) to control the voltage level on the DC bus 136 in response to the speed of the PMG 130 and DC load variations. The FOC may employ PMG rotor position sensor, such as a resolver (not shown), sense coils (not shown) or sensorless position estimation.

The dual-source multi-mode power supply system 100 further includes an electronic coordinated control module 148. The coordinated control module 148 is in signal communication with the battery power supply 102, the electric power generating system 104, and the switches 128a-128c. The coordinated control module 148 is configured to determine a load request of the first and second loads 106a-106b, and to control the plurality of switches such that the signals output from the first DC bus 114 and the second DC bus 136 are delivered to the first load 106a and/or the second load 106b so as to satisfy the load request. The load request may include, but is not limited to, a request to drive the loads 106a-106b independently from one another, a request to drive loads 106a-106b from a common bus (e.g., either the first DC bus 114 or the second DC bus 136), a request to support an overloaded load, a request to remove a short-circuit condition applied to the first load 106a and/or the second load 106b, and a request to charge the battery 108.

According to a non-limiting embodiment, the coordinated control module 148 receives load current signals $I_{Lda}$-$I_{Ldb}$ from load sensors 150a-150b, along with the converter current signal ($I_{dcc}$) and the rectifier current signal ($I_{dcr}$). If additional current is necessary to drive one or more of the loads 106a-106b, the coordinated control module 148 outputs an inverter reference signal ($I_{dccREF}$) which commands the inverter controller 122 to increase the converter current ($I_{dcc}$) applied to the first DC bus 114. The increased converter current ($I_{dcc}$) may then be selectively delivered to one or more of the loads 106a-106b so as to satisfy requirement for load sharing or overload conditions.

Figure 2:
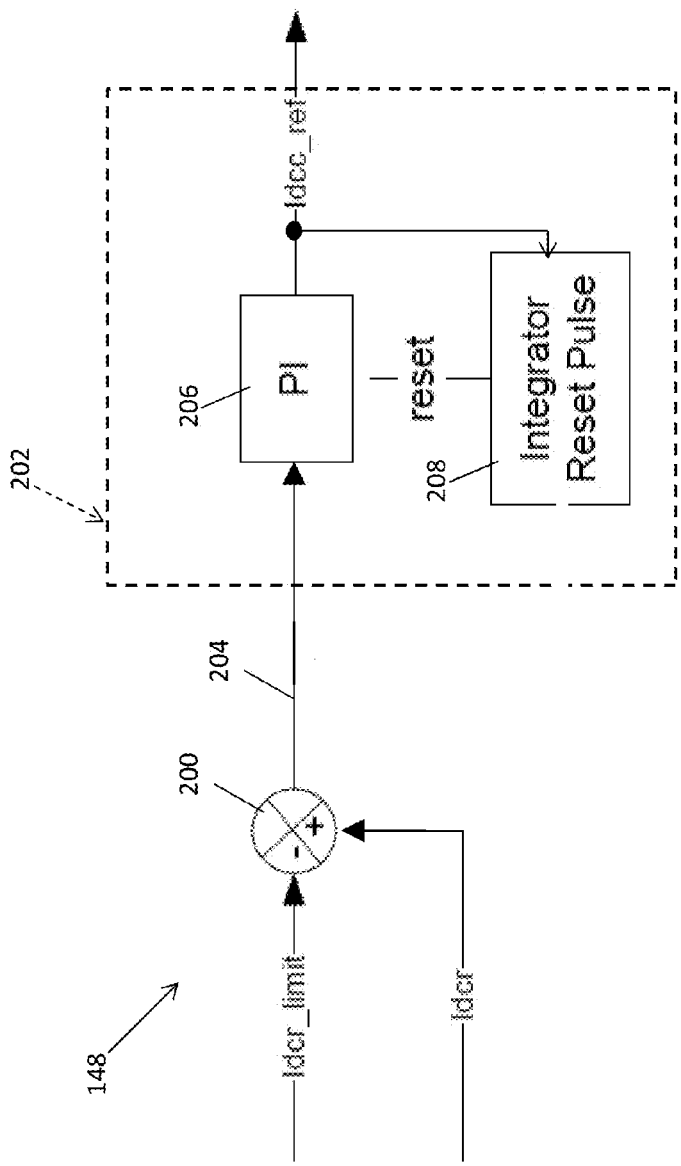
FIG. 2 is a diagram of an electronic coordinated control module included in the dual-source multi-mode power supply system of FIG. 1 according to a non-limiting embodiment.

Turning to FIG. 2, the electronic coordinated control module 148 included in the dual-source multi-mode power supply system 100 is illustrated according to a non-limiting embodiment. The coordinated control module 148 includes a signal summer 200 and an electronic proportional-integral (PI) controller 202. According to a non-limiting embodiment, the signal summer 200 receives the measured LoadA current ($I_{lda}$) value and an active rectifier current threshold signal ($I_{dcrTHR}$). The $I_{dcrTHR}$ may be preset in the coordinated control module 148 to indicate an overcurrent threshold. For example, the $I_{dcrTHR}$ may be a signal indicating a preferred output current or rated active rectifier output current produced by the PWM rectifier 138.

The sum of the combined result 204 is output to a PI logic unit 206. An integrate reset unit 208 embedded in the PI controller 202. If the PI 206 output is below the predetermined level, the integrator reset unit 208 resets the integrator within the PI logic unit 206. Accordingly, power to both the first load 106a and the second load 106b is provided by the active rectifier 134, i.e., the second DC bus 136. If, however, the combined result 204 is positive (e.g., above zero), the PI logic unit 206 may determine that an overload condition exists on the second DC bus 136, and automatically increases the value of the $I_{dccREF}$ signal output to the inverter controller 122 (see FIG. 1), thereby commanding the DC-DC converter 110 (e.g., PWM inverter 116) to increase the current output on the first DC bust 114, so additional current is provided to the first load 106a and/or the second load 106b.

With reference now to the table illustrated in FIG. 3, the various operating modes of the dual-source multi-mode power supply system 100 will be described in greater detail. More specifically, the dual-source multi-mode power supply system 100 is configured to operate in the following modes: (1) an engine start mode, (2) a first nominal powering mode, (3) a second nominal powering mode, (4) a battery charge mode, (5) a first overload mode, (6) a second overload mode, (7) a first short-circuit mode, and (8) a second short-circuit mode.

The engine start mode can be initiated by a user input signal (USER) generated in response to a request to start the engine of the vehicle. In response to receiving the USER signal, the coordinated control module 148 opens switches 128a and 128c, while closing switch 128b across the first DC bus 113 and the second DC bus 136. When the engine start mode is initiated, the DC-DC converter 110 operates in a current mode to supply current to the active rectifier 134 in response to required PMG torque during engine start. In turn, the active rectifier 134 operates as an inverter at the variable frequency and the HVDC current (i.e., $I_{dcr}$) generated by the DC-DC converter 110 results in a variable DC voltage supplied to the active rectifier 134 to support the engine start event. This arrangement improves engine start efficiency in terms of power conversion losses.

The first nominal power mode is initiated in response to receiving a USER signal indicating a request to drive various loads independently from one another. When the first nominal power mode is initiated, the DC-DC converter operates in a voltage mode. In this manner, the first load 106a is supplied by the first DC bus 114, while the second load 106b is supplied by the second DC bus 136.

The second nominal power mode is configured to provide a feature that allows the system 100 to drive various loads from the same bus. For instance, the coordinated control module 148 can close switch 128b so as to cross-couple (i.e., connect) the first DC bus 114 and the second DC bus 136. Accordingly, the active rectifier 134 controls the DC bus 136, and the DC-DC converter 110 is configured to supply current to the first DC bus 114. The second nominal power mode may also support powering the first and second loads 106a-106b from the active rectifier 134, only. According to an embodiment, the DC-DC converter 110 can either be disabled, or enabled to supply current to the coupled busses 114 and 136 that power both load A and load B. The rectifier circuit 120 prevents reverse power flow from the active rectifier powered bus 136. The DC-DC converter 110 may provide additional current to the bus 114 during the nominal modes in response to the $I_{dcREF}$ produced by the coordinated control module 148.

Alternatively, the second nominal mode may serve as a "silent mode" feature, where the first and second loads 106a-106b are powered using only the battery power, i.e., the battery power delivered to the first DC bus 114. When the silent mode is initiated, the DC-DC converter 110 operates in a voltage mode to provide a constant HVDC bus. In addition, the vehicle engine is shut off and active rectifier 138 and switches 139 are turned-off, preventing reversed power flow. The vehicle and/or other loads are therefore, powered by only the battery 108.

The battery charge mode can be initiated in either the first nominal power mode or the second nominal power mode, with or without power supplied to the loads 106a-105b. The battery charger is may be activated in response to a charger request signal (not shown) output from the coordinated control module 148. In response to initiating the battery charge mode, the DC-DC converter 110 is disabled. According to an embodiment, the battery charge mode can be automatically initiated when the remaining power level of the battery 112 falls below a threshold value and when the coordinated control module 148 enables charge mode.

The first and second overload modes are initiated when the coordinated control module 148 determines an overload condition of one or more loads 106a-106b exists. The overload condition may be determined when the load current $I_{Lda}$ and/or load current $I_{Ldb}$ exceeds an overcurrent threshold value. In response to supporting an overload condition, the coordinated control module 148 leverages power from the DC-DC converter 110 so as to support the increased loads 106a-106b. For example, if a DC bus 136 experiences an overload condition, the coordinated control module 148 increases $I_{dcREF}$ signal to command DC-DC converter 110 to supply more current to the DC bus 114. In this manner, the converter current ($I_{dcc}$) generated by the DC-DC converter 110 is diverted to the second DC bus 136 and added to the rectifier current ($I_{dcr}$) so as to support the overloaded combined bus condition due to load A or load B or both increase. If the current supplied by the DC-DC converter 110 reaches its maximum value, and no longer can support both loads, the coordinated control module 148 can disconnect a lower priority load by opening either switch 128a or switch 128c.

The first and second short-circuit modes are initiated when the coordinated control module 148 determines a short-circuit condition exists on the first DC bus 114 and/or the second DC bus 136. The short-circuit condition may be determined when the load current $I_{Lda}$ and/or load current $I_{Ldb}$ exceeds a short-circuit threshold value. In response to detecting the short-circuit condition, the coordinated control module 148 selectively controls switches 128a and 128c, while keeping switch 128b closed. In this manner, the first DC bus 114 and the second DC bus 136 are cross-coupled, and the short circuit current is provided by both the DC-DC converter 110 and the active rectifier 134 until the shorted load is disconnected by switch 128a or switch 128c. In other words, the coordinated control module 148 can detect whether a short-circuit is applied to load 106a and/or load 106b, and can open switches 128a and/or 128c to respectively remove the short-circuited load from the system 100. As described in detail above, a dual-source multi-mode power supply is provided that operates in various powering modes so as to optimizes use of existing assets of the vehicle's power generating system. In this manner, the dual-source multi-mode power supply according to at least one embodiment supports multiple functions without oversizing individual power converters.

As used herein, the term "module" refers to an application specific integrated circuit (ASIC), an electronic circuit, a computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A dual-source multi-mode power supply system comprising:
a battery power supply including a direct current to direct current (DC-DC) converter circuit configured to con- vert a first DC voltage supplied by a battery into a second DC voltage that is greater than the first DC voltage;

a first DC bus having connected to the battery power supply the second DC voltage;

an electric power generating system (EPGS) including a permanent magnet generator (PMG) and an active rectifier circuit configured to convert a variable-voltage/variable-frequency output from the PMG into a constant high-voltage direct current (HVDC) output;

a second DC bus having connected to the HVDC output;

a plurality of switches configured to selectively isolate and cross-couple the first and second DC buses with respect to one another; and an electronic coordinated microcontroller in signal communication with the battery power supply, the electric power generating system and the switches, the coordinated microcontroller configured to determine a load request of at least one of the first and second loads, and to control the plurality of switches such that the power from the first DC bus and power from the second DC bus are delivered to the loads so as to satisfy the load request.

2. The system of claim 1, wherein the coordinated microcontroller determines an overload condition of at least one of the first and second loads, and controls at least one switch among the plurality of switches to cross-couple the first and second DC buses to generate a combined current that is delivered to at least one of the first and second loads experiencing the overload condition.

3. The system of claim 2, wherein in response to determining the first load realizes the overload condition, the coordinated microcontroller opens at least one first switch to disconnect the second load, and closes at least one second switch to cross-couple the first DC bus and the second DC bus so as to deliver the combined current to the first load.

4. The system of claim 2, wherein in response to support the second load that experiences the overload condition, the coordinated microcontroller opens the at least one second switch to disconnect the first load, and closes at least one first switch to cross-couple the first DC bus and the second DC bus so as to deliver the combined current to the second load.

5. The system of claim 2, wherein the coordinated microcontroller determines the overload condition based on a comparison between the HVDC output to the second DC bus and an overcurrent threshold value.

6. The system of claim 5, wherein the coordinated microcontroller controls the DC-DC converter to adjust a first level of the DC-DC converter current output from the DC-DC converter based on a second level of the active rectifier current.

7. The system of claim 6, wherein coordinated microcontroller commands the DC-DC converter to increase the first level of the current output from the DC-DC converter in response to the second level of the current from the active rectifier exceeding the overcurrent threshold value.

8. The system of claim 7, wherein the overcurrent threshold value corresponds to preset rated active rectifier output current.

9. The system of claim 1, wherein the load request indicates a demand to drive the first and second loads independently from one another, and wherein the coordinated microcontroller controls at least one first switch among the plurality of switch to connect the first load to only the first DC bus, and controls at least one second switch among the plurality of switches to connected the second load to only the second DC bus.

10. The system of claim 1, wherein the request indicates a demand to drive the first and second loads from a common bus, and wherein the coordinated microcontroller controls the plurality of switches such that at least one of the first load and the second load are commonly connected to at least one of the first DC bus and the second DC bus.

11. The system of claim 10, wherein in response to the load request indicating a demand to drive the first and second loads using the current output from the DC-DC converter, the coordinated microcontroller disables the active rectifier circuit and controls the plurality of switches such that each of the first and second loads are connected to both the first DC bus and the second DC bus.

12. The system of claim 10, wherein in response to the load request indicating a demand to drive the first and second loads using the active rectifier current, the coordinated microcontroller disables the DC-DC converter circuit and controls the plurality of switches such that each of the first and second loads are connected to both the first DC bus and the second DC bus.

13. The system of claim 1, in response to receiving a request to start an engine, the coordinated microcontroller opens at least one first switch to disconnect the first and second loads from the first and second DC buses, and controls at least one second switch to cross-couple the first and second DC buses so as to combine the DC-DC converter current with the current output from the active rectifier on the second DC bus to start the engine.

14. The system of claim 1, further comprising a battery charging circuit configured to charge a battery included in the battery power supply, wherein the coordinated microcontroller deactivates the DC-DC converter and connects the battery charging circuit to the battery in response to receiving a load request demanding to charge the battery.

15. The system of claim 14, wherein the coordinated microcontroller automatically disconnects the battery charging circuit from the battery and automatically enables the DC-DC converter in response to receiving a load request indicating at least one of an overload condition or a short-circuit condition.

16. The system of claim 1, wherein the coordinated microcontroller determines a short-circuit connection to at least one of the first and second loads, and controls at least one switch among the plurality of switches to disconnect at least one of the first and second loads experiencing the short-circuit condition from the first and second DC buses.

* * * * *